（12）United States Patent
Chiu et al.

(10) Patent No.: US 9,189,030 B2
(45) Date of Patent: Nov. 17, 2015

(54) METHOD OF HANDLING HOLDING SENSORS AND RELATED MOBILE DEVICE

(75) Inventors: Yung-Hsiang Chiu, Taoyuan County (TW); Yu-Cheng Lee, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 199 days.

(21) Appl. No.: 13/545,959

(22) Filed: Jul. 10, 2012

(65) Prior Publication Data

US 2014/0018030 A1    Jan. 16, 2014

(51) Int. Cl.
| | | |
|---|---|---|
| *H04M 1/00* | (2006.01) | |
| *G06F 1/16* | (2006.01) | |
| *H04M 1/725* | (2006.01) | |
| *G06F 3/01* | (2006.01) | |
| *G06F 3/041* | (2006.01) | |

(52) U.S. Cl.
CPC ............ *G06F 1/1656* (2013.01); *G06F 1/1626* (2013.01); *G06F 3/011* (2013.01); *G06F 3/041* (2013.01); *H04M 1/72522* (2013.01); *H04M 2250/12* (2013.01)

(58) Field of Classification Search
USPC .............. 455/404.1, 550.1, 556.1, 567, 575.1
See application file for complete search history.

(56) References Cited

U.S. PATENT DOCUMENTS

| | | | |
|---|---|---|---|
| 7,978,176 | B2 | 7/2011 | Forstall |
| 2002/0021278 | A1* | 2/2002 | Hinckley et al. ............... 345/156 |
| 2010/0003960 | A1* | 1/2010 | Ray et al. .................... 455/404.2 |
| 2010/0035656 | A1* | 2/2010 | Pan ................. 455/566 |
| 2010/0317332 | A1* | 12/2010 | Bathiche et al. .............. 455/418 |
| 2013/0095810 | A1* | 4/2013 | Moreton et al. .............. 455/418 |
| 2013/0196712 | A1* | 8/2013 | Lin et al. ....................... 455/557 |

FOREIGN PATENT DOCUMENTS

| | | |
|---|---|---|
| CN | 101631157 A | 1/2010 |
| TW | M433033 | 7/2012 |

OTHER PUBLICATIONS

Office action mailed on Nov. 18, 2014 for the Taiwan application No. 101130145, filling date Aug. 20, 2012, pp. 1-10.
Office action mailed on Jun. 17, 2015 for the China application No. 201210305627.9, filing date Aug. 24, 2012.

* cited by examiner

*Primary Examiner* — Joel Ajayi
(74) *Attorney, Agent, or Firm* — Winston Hsu; Scott Margo (57) ABSTRACT

A method for handling a mobile device with a plurality of holding sensors is disclosed. The method comprises receiving a user input via one or more holding sensors of the plurality of holding sensors; and executing a function according to a touched pattern of the one or more holding sensors; wherein the plurality of holding sensors are located on a housing of the mobile device.

15 Claims, 6 Drawing Sheets

METHOD OF HANDLING HOLDING SENSORS AND RELATED MOBILE DEVICE

TECHNICAL FIELD

The present invention relates to a method of handling holding sensors and related mobile device, and more particularly, to a method and a mobile device capable of handling holding sensors of the mobile device to execute a function of the mobile device.

BACKGROUND

A mobile device such as a mobile phone and a tablet computer can provide various functions (e.g., via applications installed in the mobile device) such as taking/viewing pictures, playing music and movies, playing games, sending/receiving emails and message, etc., to the user. Besides, a size and power consumption of the mobile device have been continuously and significantly reduced due to modern advancement of semiconductor technologies. Thus, the mobile device has become a daily and essential appliance carried by a user.

However, even though design of the mobile device is greatly improved nowadays, hardware buttons and hardware controllers are necessarily installed in the mobile device. That is, the hardware buttons and the hardware controllers are still necessary for controlling functions of the mobile device, e.g., volume, applications and camera. Accordingly, thickness of the mobile device can not be further reduced, and convenience of the mobile device is limited. Therefore, how to execute the functions without needs of the hardware buttons and the hardware controllers is a topic to be discussed.

SUMMARY

The present invention therefore provides a method and a mobile device capable of handling holding sensors of the mobile device to execute a function of the mobile device so as to solve the abovementioned problems.

A method for handling a mobile device with a plurality of holding sensors is disclosed. The method comprises receiving a user input via one or more holding sensors of the plurality of holding sensors; and executing a function according to a touched pattern of the one or more holding sensors; wherein the plurality of holding sensors are located on a housing of the mobile device.

A communication device comprising a processor for executing a program, a plurality of holding sensors and a storage unit coupled to the processor storing the program is disclosed. When executed by the processor, the program instructs the processor to perform the steps of receiving a user input via one or more holding sensors of the plurality of holding sensors; and executing a function according to a touched pattern of the one or more holding sensors; wherein the plurality of holding sensors are located on a housing of the communication device.

A computer-readable storage medium storing a program for handling a plurality of holding sensors of a communication device is disclosed. When executed by a processor of the communication device, the program instructing the processor to perform the steps of receiving a user input via one or more holding sensors of the plurality of holding sensors; and executing a function according to a touched pattern of the one or more holding sensors; wherein the plurality of holding sensors are located on a housing of the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
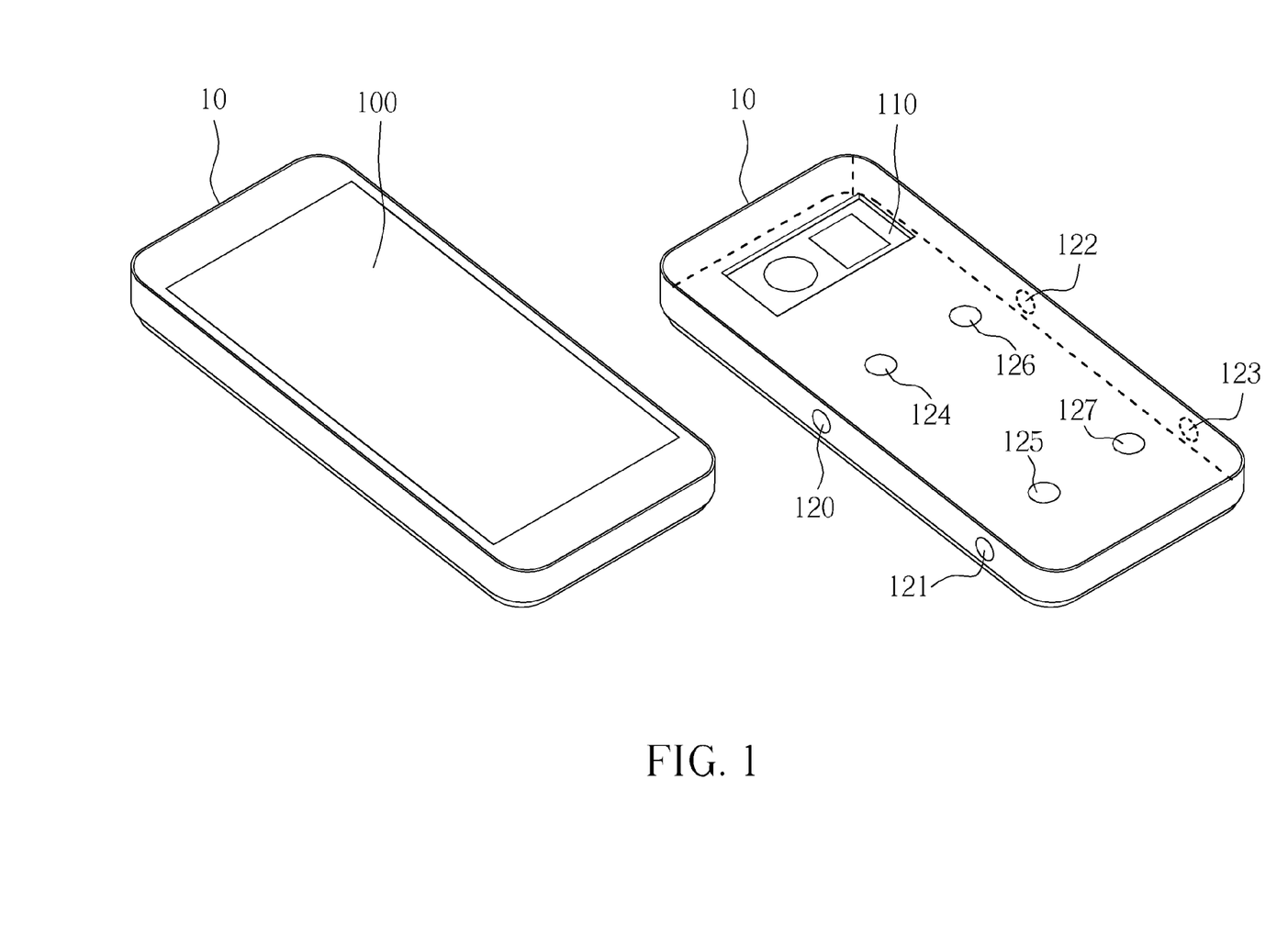
FIG. 1 is a schematic diagram of a mobile device according to an example of the present invention.

Please refer to FIG. 1, which is a schematic diagram of a mobile device 10 according to an example of the present invention. The mobile device 10 includes a screen 100, a camera 110, and 8 holding sensors 120-127. In detail, the screen 100 is installed in a front of the mobile device 10 for displaying information and images stored in or generated by the mobile device 10. Preferably, the camera 100 is embedded in a back of the mobile device 10. The camera 110 is capable performing a shutter function for taking a picture, and may also perform an auto focus function and/or a flash function for improving quality of the picture. Please note that, the camera 110 is only used for illustrating the present invention, and the present invention can be realized without the camera 110. The holding sensors 120-127 are located on a housing of the mobile device 10, wherein the holding sensors 120-123 are located on two sides of the mobile device 10, and the holding sensors 124-127 are located on the back of the mobile device 10. Preferably, the holding sensors 120-127 are embedded in the housing of the mobile device 10.

Please note that, the mobile device 10 and an arrangement (e.g. amount and positions) of the holding sensors 120-127 are simply used for illustrating the present invention. Practically, the mobile device 10 can be a mobile phone, laptop, tablet computer, electronic book and portable computer system, and is not limited. Further, the mobile device 10 may include hardware buttons and hardware controllers for controlling functions of the mobile device 10, e.g., volume, applications and the camera 110. The arrangement of the holding sensors 120-127 are not limited to those shown in FIG. 1, and can be arranged according to requirements, design considerations, etc. For example, holding sensors may be located on only sides of the mobile device 10, or on only the back of the mobile device 10. The amount of the holding sensors is not limited to 8, and can be any positive integer (e.g., 1, 2, 3, 4, etc.). Preferably, the amount of the holding sensors is not larger than 24.

Figure 2:
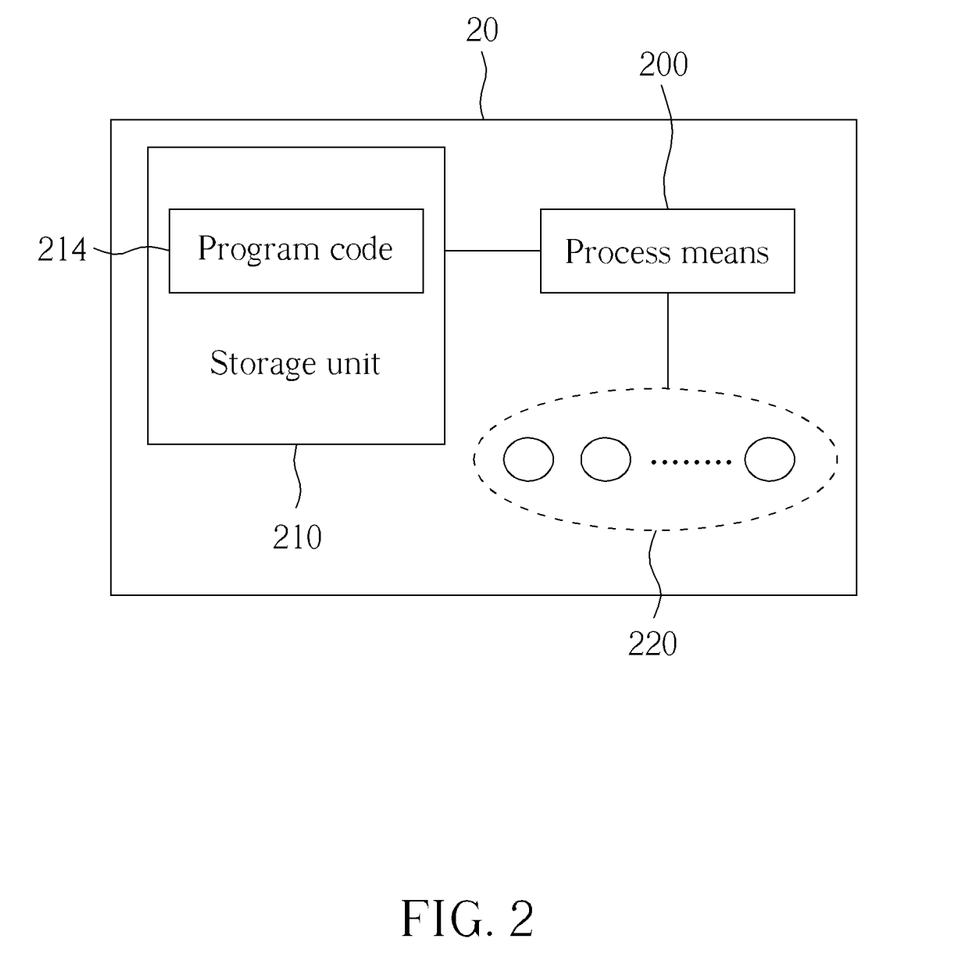
FIG. 2 is a schematic diagram of a communication device according to an example of the present invention.

Please refer to FIG. 2, which is a schematic diagram of a communication device 20 according to an example of the present invention. The communication device 20 may include a processing means 200 such as a microprocessor or Application Specific Integrated Circuit (ASIC), a storage unit 210 and holding sensors 220. The storage unit 210 may be any data storage device that can store a program code 214, accessed and executed by the processor 200. Examples of the storage unit 210 is preferably a non-transitory computer-readable storage medium, and may include (but not limited to) a subscriber identity module (SIM), read-only memory (ROM), flash memory, random-access memory (RAM), CD-ROM/DVD-ROM, magnetic tape, hard disk, optical data storage device and solid-state drive (SSD). The mobile device 10 can be realized according to the communication device 20, but is not limited herein. For example, the process means 200 receives a user input via the holding sensors 220, executes the program code 214 according to the user input, and generates a corresponding result after executing the program code 214.

Figure 3:
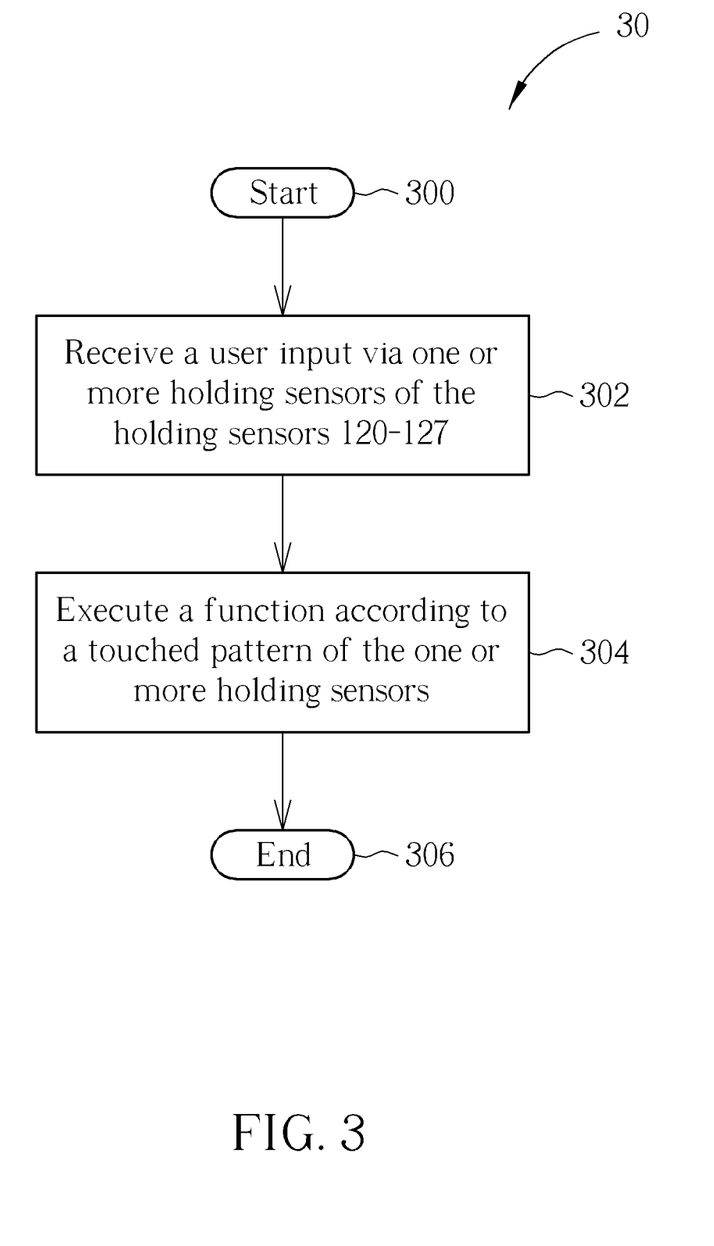
FIG. 3 is a flowchart of a process according to an example of the present invention.

Please refer to FIG. 3, which is a flowchart of a process 30 according to an example of the present invention. The process 30 is utilized in the mobile device 10 shown in FIG. 1, for handling the holding sensors 120-127, to execute a function of the mobile device 10. The process 30 may be compiled into the program code 214 and includes the following steps:

Step 300: Start.

Step 302: Receive a user input via one or more holding sensors of the holding sensors 120-127.

Step 304: Execute a function according to a touched pattern of the one or more holding sensors.

Step 306: End.

According to the process 30, after receiving a user input via one or more holding sensors of the holding sensors 120-127, the mobile device 10 executes a function according to a touched pattern of the one or more holding sensors, wherein the holding sensors 120-127 are located on the housing of the mobile device 10. In other words, the mobile devices 10 can execute the function according the touched pattern which can be any combination of an amount, location and a touched sequence of the one or more holding sensors. Therefore, since functions originally triggered (i.e., executed) by hardware buttons and hardware controllers (e.g., touch screen) can be triggered by holding sensors according to the process 30, an amount of the hardware buttons and the hardware controllers of the mobile device 10 can be reduced. Further, the hardware buttons and the hardware controllers may even be removed completely. As a result, thickness of the mobile device 10 is reduced, appearance of the mobile device 10 is enhanced, and convenience of the mobile device 10 is improved.

Please note that, a spirit of the process 30 is to execute the function of the mobile device 10 according to the touched pattern of the one or more holding sensors (hereafter the touched sensors for short), such that the thickness, the appearance and the convenience of the mobile device 10 are improved. Realization of the process 30 is not limited.

For example, the touched pattern can be related to an amount of the touched sensors. That is, functions of the mobile device 10 are triggered by amounts of the touched sensors, respectively. In detail, when one of the holding sensors 120-127 is touched, a first function of the mobile device 10 is triggered, wherein the one of the holding sensors 120-127 can be anyone of the holding sensors 120-127, e.g. the holding sensor 124. When two of the holding sensors 120-127 are touched, a second function of the mobile device 10 is triggered, wherein the two of the holding sensors 120-127 can be any two of the holding sensors 120-127, e.g. the holding sensors 120 and 121. Thus, a function is triggered only according to the amount of the touched sensors.

On the other hand, the touched pattern can be related to location of the touched sensors. That is, functions of the mobile device 10 are triggered by touched sensors, respectively. In detail, when one of the holding sensors 120-127 (e.g. the holding sensor 123) is touched, a first function of the mobile device 10 is triggered. When another one of the holding sensors 120-127 is touched (e.g. the holding sensor 125), a second function of the mobile device 10 is triggered. Besides, functions of the mobile device 10 can be triggered by sets of the holding sensors 120-127, respectively. In detail, when a first set of the holding sensors 120-127 (e.g. the holding sensors 120 and 122) is touched, a first function of the mobile device 10 is triggered. When a second set of the holding sensors 120-127 is touched (e.g. the holding sensors 121-123), a second function of the mobile device 10 is triggered. Thus, a function is triggered according to the touched sensors.

On the other hand, the touched pattern can be related to a touched sequence of the touched sensors. That is, functions of the mobile device 10 are triggered by touched sequences of the touched sensors, respectively. In detail, when the touched sensors are touched in a first touched sequence, a first function of the mobile device 10 is triggered. For example, the first function is triggered, if the holding sensors 120 and 122 are touched sequentially. When the touched sensors are touched in a second touched sequence, a second function of the mobile device 10 is triggered. For example, the second function is triggered, if the holding sensors 122 and 120 are touched sequentially. In another example, a third function may be triggered, if the holding sensors 121, 120 and 123 are touched sequentially. Thus, a function is triggered according to the touched sequence of the touched sensors. Furthermore, the touched pattern can be related to any combination of the amount, the location and the touched sequence of the touch sensors, and is not limited herein.

Please note that, the abovementioned function of the mobile device 10 can be a function configured in the mobile device 10. For example, the function is configured by a user, or is built by a manufacturer of the mobile device 10. Alternatively, the abovementioned function can be a function of an application in the mobile device 10. For example, the application may be built by the manufacturer of the mobile device 10. In another example, the application may be downloaded by a user of the mobile device 10. In another example, the application may be installed by the user or may be a portable application which can be used without installation. Further, the application may be an application which is currently executed (e.g., in foreground or background) in the mobile device 10.

In one example, the application can be a camera application for controlling the camera 110. The function of the camera application can be any combination of an auto focus function, a flash function and a shutter function. For example, when the holding sensor 122 is touched, the auto focus function is triggered. Then, the holding sensor 120 is further touched for triggering the shutter function. That is, the holding sensors 122 and 120 are touched sequentially, for controlling the camera 110 to perform the auto focus function and the shutter function sequentially. Besides, when the flash function is considered, the holding sensor 121 can be touched for triggering the flash function and the shutter function. That is, when the holding sensors 122 and 121 are touched sequentially, the camera 110 performs the auto focus function, the flash function and the shutter function sequentially. Thus, a picture is taken without the flash function after both the holding sensors 122 and 120 are touched, and the picture is taken with the flash function after both the holding sensors 122 and 121 are touched. Besides, the picture can also be taken after only one of the holding sensors 120-127 is touched such that the picture is taken more easily. For example, the picture is taken without the flash function after touching only the holding sensor 120, and the picture is taken with the flash function after touching only the holding sensor 121. That is, the auto focus function and the shutter function are triggered after touching the holding sensor 120, and the auto focus function, the flash function and the shutter function are triggered after touching the holding sensor 121.

In another example, the application can be a phone application. The function of the phone application can comprise handling an incoming call of the mobile device 10. In detail the incoming call can be muted, rejected or accepted by touching one or more holding sensors according to a corresponding touched pattern. For example, the incoming call can be muted by touching the holding sensor 124; the incoming call can be rejected by touching the holding sensor 125; and the incoming call can be accepted by touching the holding sensor 126. The function of the phone application can comprise sending an emergency call and/or an emergency message. In detail, the emergency call and/or the emergency message can be sent by touching one or more holding sensors according to a corresponding touched pattern. For example, the emergency call can be sent by touching the holding sensor 122; and the emergency message can be sent by touching the holding sensor 123; and both the emergency call and the emergency message are sent by touching the holding sensor 121.

In another example, the function can include handling power saving of the mobile device 10. In detail, the power saving can be turned on/off by touching one or more holding sensors according to a corresponding touched pattern. For example, the power saving can be turned (i.e., switched) on/off by touching the holding sensor 127. That is, the holding sensor 127 can be touched for turning on the power saving, and can be touched again for turning off the power saving. In another example, the power saving can be turned on by touching the holding sensor 125; and the power saving can be turned off by touching the holding sensor 127.

On the other hand, the function can include handling rotation of a display on the screen 100. For example, the display can be rotated or fixed by touching one or more of the holding sensors 120-127. Further, the display can be referred to only an image displayed on the screen 100, or can be referred to the whole display including both the image and an interface (e.g., graphical user interface (GUI)) shown on the screen 100. That is, the function can rotate only the image or the whole display.

Figure 4A:
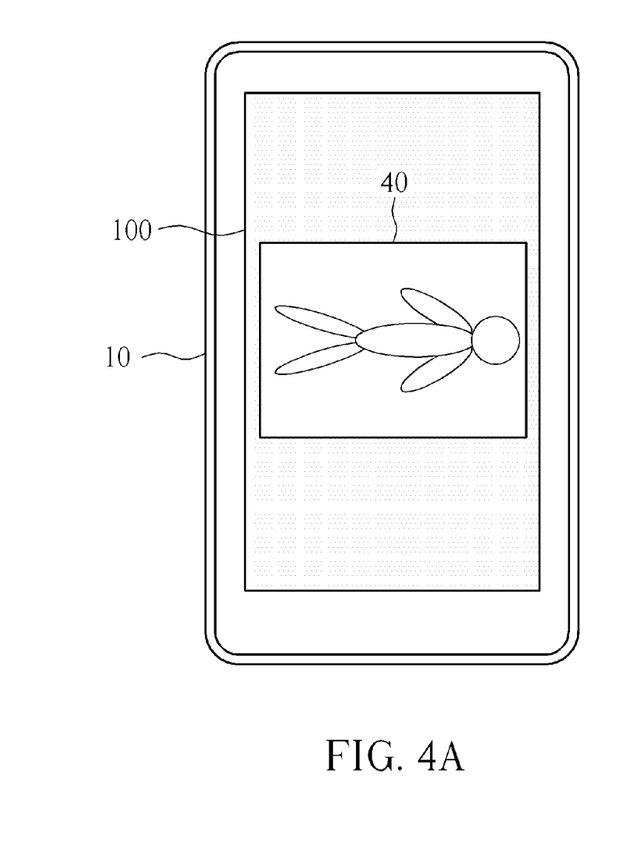
FIG. 4A is a schematic diagram of an image displayed on the screen according to an example of the present invention.
Figure 4B:
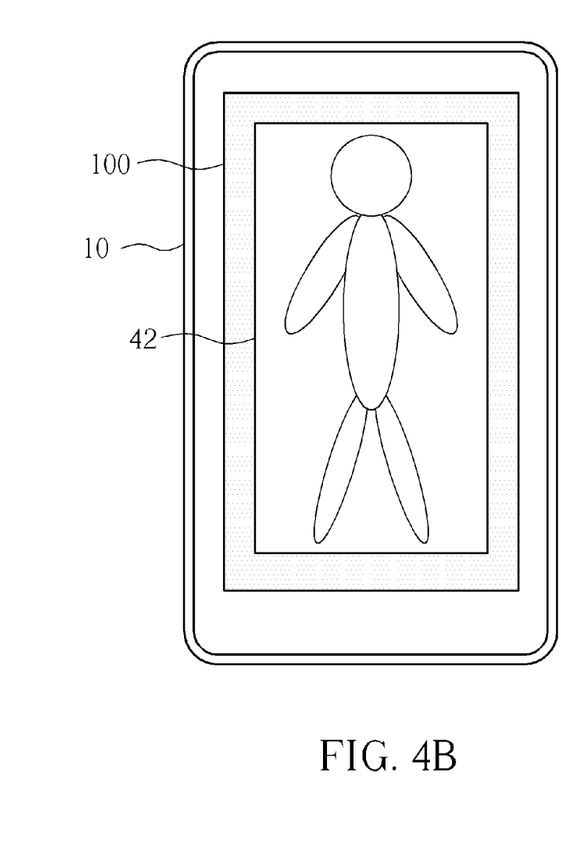
FIG. 4B is a schematic diagram of an image displayed on the screen according to an example of the present invention.

Please refer to FIGS. 4A and 4B, which are schematic diagrams of images displayed on the screen 100 according to an example of the present invention. In FIG. 4A, the mobile device 10 is held in the portrait mode, and an image 40 is displayed on the screen 100 with a reduced size due to shape of the image 40. To solve this problem, the holding sensor 121 can be touched to rotate the image 40 counterclockwise 90 degrees and enlarge the image 40 as an image 42 on the screen 100 as shown in FIG. 4B. Since the image 42 is displayed in the portrait mode and the shape of the image 42 is consistent with the screen 100, the image 42 is displayed more clearly without rotating the mobile device 10. Please note that, an interface (not shown in FIGS. 4A and 4B) on the screen 100 can also be rotated correspondingly when the holding sensor 121 is touched, i.e., the whole display is rotated. In another example, the holding sensor 122 can be touched to rotate the image 40 (and maybe also the interface) clockwise (or counterclockwise) 180 degrees. The holding sensor 123 can be touched to rotate the image 40 (and maybe also the interface) clockwise (or counterclockwise) 90 degrees. Thus, the display on the screen 100 can be viewed easily and clearly.

Figure 5A:
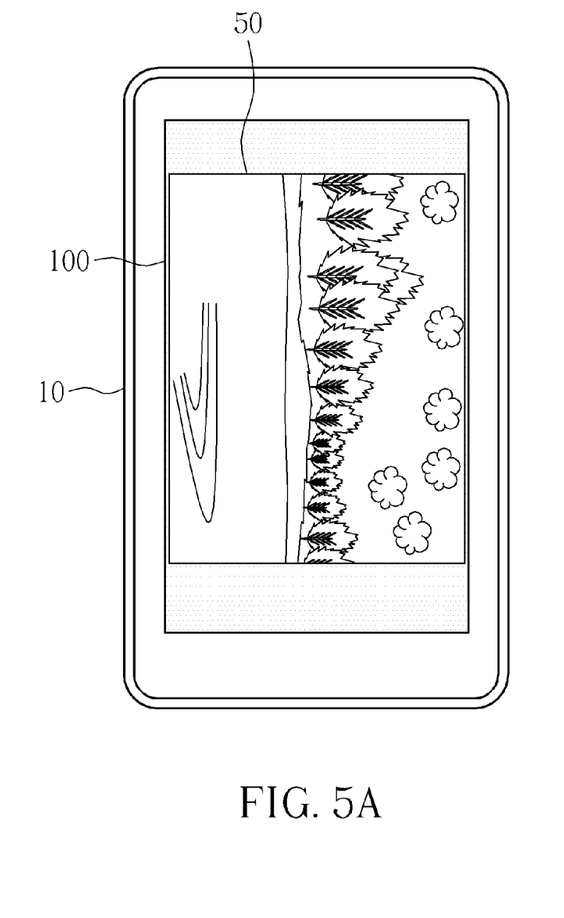
FIG. 5A is a schematic diagram of an image displayed on the screen according to an example of the present invention.
Figure 5B:
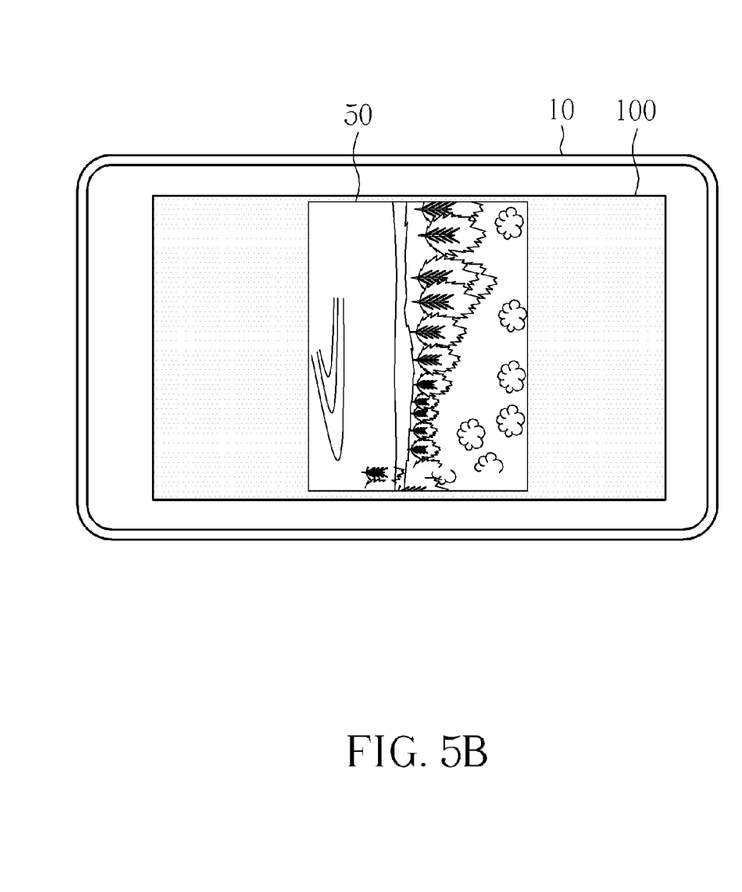
FIG. 5B is a schematic diagram of an image displayed on the screen according to an example of the present invention.
Figure 5C:
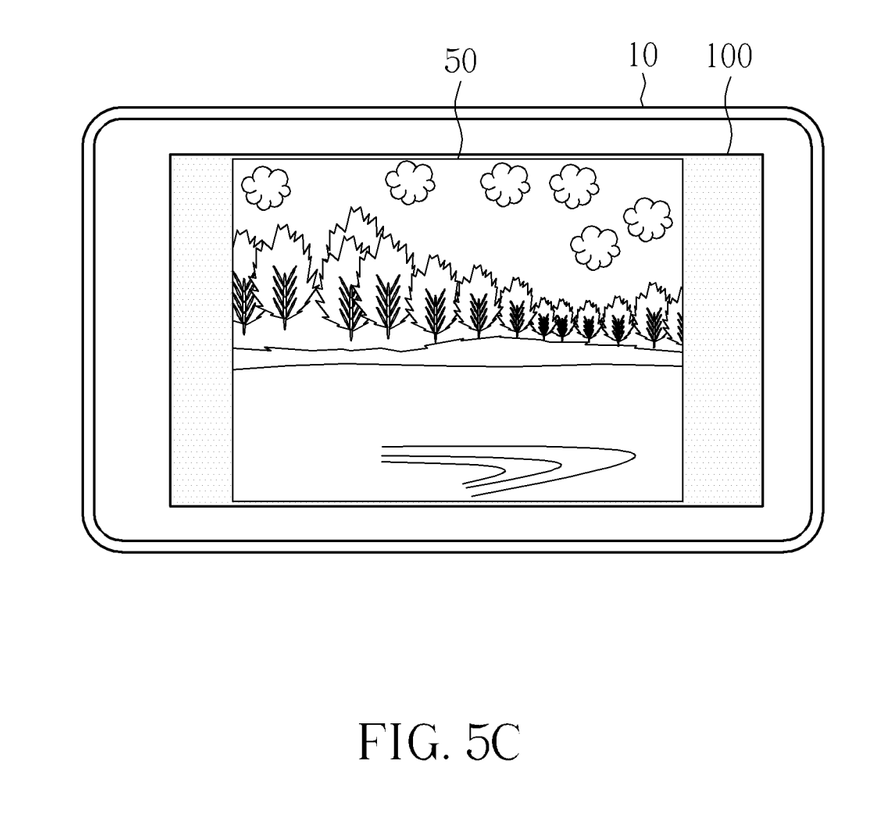
FIG. 5C is a schematic diagram of an image displayed on the screen according to an example of the present invention.

Please refer to FIGS. 5A, 5B and 5C, which are schematic diagrams of an image displayed on the screen 100 according to an example of the present invention. In FIG. 5A, the mobile device 10 is held in the portrait mode, an image 50 is displayed on the screen 100 laterally, and cannot be viewed easily. If the mobile device 10 is simply rotated counterclockwise 90 degrees, the image 50 may be rotated clockwise 90 degrees on the screen 100 with a reduced size as shown in FIG. 5B due to operation of a gyroscope of the mobile device 10. To solve this problem, when rotating the mobile device 10 counterclockwise 90 degrees, the holding sensor 120 can be touched to fix the image 50 on the screen 100 without rotation as shown in FIG. 5C. Thus, the image 50 can be viewed easily and clearly. Please note that, an interface (not shown in FIGS. 5A and 5C) on the screen 100 can also be fixed correspondingly when the holding sensor 120 is touched, i.e., the whole display is fixed on the screen 100 without rotation.

As can be seen from the above, a function triggered by a touched pattern is arbitrary as long as the function is supported by the mobile device 10, e.g., supported by an application stored (e.g. installed) in the mobile device 10. Further, the touched pattern is also arbitrary, and can be any combination of an amount, location and a touched sequence of touched sensors. Those skilled in the art should readily make modifications, alterations or combinations on the above illustrations accordingly. Furthermore, the relation between the function and the touched pattern can be configured by a user of the mobile device 10. That is, the user can configure the relation between the function and the touched pattern according to individual preference. Alternatively, the relation between the function and the touched pattern can be defined in a template for a user to choose. That is, some templates may be configured and stored in the mobile device 10, wherein each template defines a corresponding set of relations between functions and touched patterns. Thus, the user does not need to configure the relations by himself, but can choose one of the templates for enabling a corresponding set of relations between functions and touched patterns instead. Besides, the relation between the function and the touched pattern can be predefined in the mobile device 10 (e.g., by a manufacturer of the mobile device 10). Thus, a user does not need to configure the relation, and also does not need to choose a template defining the relation.

The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of using holding sensors of a mobile device to trigger functions originally triggered (i.e., executed) by hardware buttons and hardware controllers (e.g. touch screen) of the mobile device. Therefore, an amount of the hardware buttons and the hardware controllers can be reduced. Further, the hardware buttons and the hardware controllers may even be removed completely. As a result, thickness of the mobile device is reduced, appearance of the mobile device 10 enhanced, and convenience of the mobile device is improved.

Those skilled in the art will readily observe that numerous modifications and alterations of the device and method may be made while retaining the teachings of the invention.

Accordingly, the above disclosure should be construed as limited only by the metes and bounds of the appended claims.

The invention claimed is:

1. A method for handling a mobile device with a plurality of holding sensors located on a housing of the mobile device, the method comprising:
   executing a camera application, wherein in the camera application, the plurality holding sensors comprise a first holding sensor corresponding to an auto focus function, a second holding sensor corresponding to a flash function, and a third holding sensor corresponding to a shutter function;
   receiving a first touched pattern input by touching the first holding sensor and the third holding sensor sequentially;
   executing a first function according to the first touched pattern, wherein the first function comprises taking a picture without the flash function;
   receiving a second touched pattern input by touching the first holding sensor, the second holding sensor and the third holding sensor sequentially; and
   executing a second function according to the second touched pattern, wherein the second function comprises taking a picture with the flash function.

2. The method of claim 1, wherein the plurality of holding sensors are located on one or more sides or a back of the housing of the mobile device.

3. The method of claim 1, wherein the first touched pattern is related to locations of the first holding sensor and the third holding sensor, and the second touched pattern is related to locations of the second holding sensor and the third holding sensor.

4. The method of claim 1, wherein the camera application is currently executed in the mobile device.

5. The method of claim 1, wherein a first relation between the first function and the first touched pattern is configured by a user of the mobile device, or a second relation between the second function and the second touched pattern is configured by the user.

6. The method of claim 1, wherein a first relation between the first function and the first touched pattern is defined in a template for a user to choose, or a second relation between the second function and the second touched pattern is defined in the template for the user to choose.

7. The method of claim 1, wherein a first relation between the function and the first touched pattern is predefined in the mobile device, or a second relation between the second function and the second touched pattern is predefined in the mobile device.

8. A communication device comprising:
   a processor for executing a program;
   a plurality of holding sensors located on a housing of the communication device; and
   a storage unit coupled to the processor storing the program;
   wherein when executed by the processor, the program instructs the processor to perform the following steps:
      executing a camera application, wherein in the camera application, the plurality holding sensors comprise a first holding sensor corresponding to an auto focus function, a second holding sensor corresponding to a flash function, and a third holding sensor corresponding to a shutter function;
      receiving a first touched pattern input by touching the first holding sensor and the third holding sensor sequentially;
      executing a first function according to the first touched pattern, wherein the first function comprises taking a picture without the flash function;
      receiving a second touched pattern input by touching the first holding sensor, the second holding sensor and the third holding sensor sequentially; and
      executing a second function according to the second touched pattern, wherein the second function comprises taking a picture with the flash function.

9. The communication device of claim 8, wherein the plurality of holding sensors are located on one or more sides or a back of the housing of the communication device.

10. The communication device of claim 8, wherein the first touched pattern is related to locations of the first holding sensor and the third holding sensor, and the second touched pattern is related to locations of the second holding sensor and the third holding sensor.

11. The communication device of claim 8, wherein the camera application is currently executed in the communication device.

12. The communication device of claim 8, wherein a first relation between the first function and the first touched pattern is configured by a user of the mobile device, or a second relation between the second function and the second touched pattern is configured by the user.

13. The communication device of claim 8, wherein a first relation between the first function and the first touched pattern is defined in a template for a user to choose, or a second relation between the second function and the second touched pattern is defined in the template for the user to choose.

14. The communication device of claim 8, wherein a first relation between the first function and the first touched pattern is predefined in the communication device, or a second relation between the second function and the second touched pattern is predefined in the mobile device.

15. A non-transitory computer-readable storage medium storing a program for handling a plurality of holding sensors located on a housing of a communication device, when executed by a processor of the communication device, the program instructing the processor to perform the following steps:
   executing a camera application, wherein in the camera application, the plurality holding sensors comprise a first holding sensor corresponding to an auto focus function, a second holding sensor corresponding to a flash function, and a third holding sensor corresponding to a shutter function;
   receiving a first touched pattern input by touching the first holding sensor and the third holding sensor sequentially;
   executing a first function according to the first touched pattern, wherein the first function comprises taking a picture without the flash function;
   receiving a second touched pattern input by touching the first holding sensor, the second holding sensor and the third holding sensor sequentially; and
   executing a second function according to the second touched pattern, wherein the second function comprises taking a picture with the flash function.

* * * * *